United States Patent [19]

Yosko

[11] Patent Number: 5,585,782
[45] Date of Patent: Dec. 17, 1996

[54] LIGHT BAR FOR A VEHICLE

[76] Inventor: Scott Yosko, 613 N. Reid St., Woodville, Tex. 75979

[21] Appl. No.: 345,249

[22] Filed: Nov. 28, 1994

[51] Int. Cl.⁶ .................................................. B60Q 1/52
[52] U.S. Cl. ............................. 340/471; 362/32; 362/35; 362/74
[58] Field of Search .................................. 340/471, 472, 340/468, 331, 332; 362/32, 35, 74

[56] References Cited

U.S. PATENT DOCUMENTS

| | | | |
|---|---|---|---|
| 3,633,161 | 1/1972 | Price | 340/472 |
| 4,104,615 | 8/1978 | Everest | 340/472 |
| 4,496,215 | 1/1985 | Shaheen et al. | 350/96.23 |
| 5,000,535 | 3/1991 | Churchill | 362/32 |
| 5,097,397 | 3/1992 | Stanuch et al. | 362/74 |
| 5,122,933 | 6/1992 | Johnson | 362/32 |
| 5,165,774 | 11/1992 | Windross | 362/32 |
| 5,193,893 | 3/1993 | Mitko | 362/32 |
| 5,276,594 | 1/1994 | Burkett et al. | 362/32 |
| 5,452,188 | 9/1995 | Green et al. | 362/74 |
| 5,469,337 | 11/1995 | Cassarly et al. | 362/32 |

OTHER PUBLICATIONS

Gall's Catalog, 1994 pp. 206–221.

Primary Examiner—Jeffery Hofsass
Assistant Examiner—Nina Tong
Attorney, Agent, or Firm—Harrison & Egbert

[57] ABSTRACT

A light bar for a vehicle including a body, a light source, a plurality of optical fibers extending within the body, and a housing for directing light from the light source to the plurality of optical fibers. The optical fibers have one end generally facing the light source and another end facing outwardly at the body. The housing is positioned within the body. The light source is stationary and non-rotatable relative to the body. The housing is rotatable relative to the light source. The housing has at least one aperture formed therein. The light source directs light through the aperture to at least one of the plurality of optical fibers. A reflective surface is formed within the housing generally opposite the aperture so as to focus light toward the aperture. A motor is connected to the housing and is positioned within the body. A power supply is electrically connected to the light source and to the motor.

15 Claims, 2 Drawing Sheets

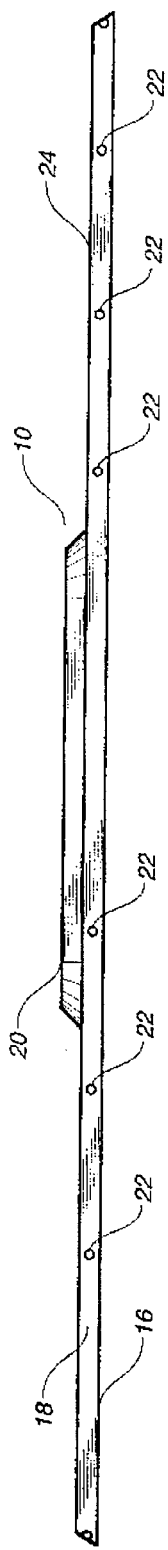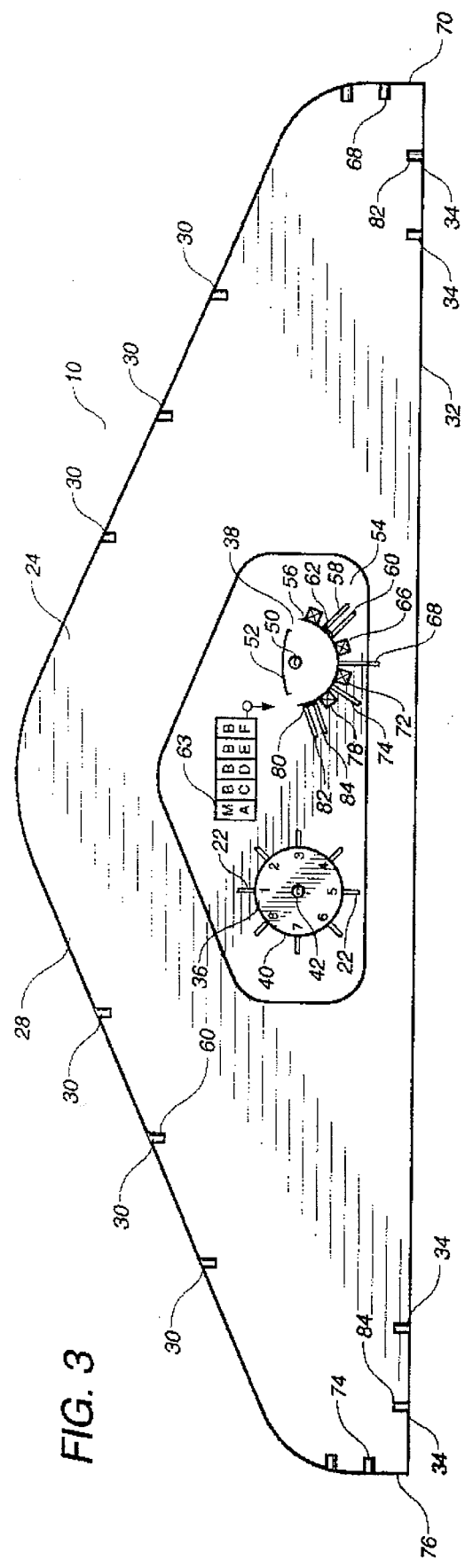

LIGHT BAR FOR A VEHICLE

TECHNICAL FIELD

The present invention relates to light bars. More particularly, the present invention relates to light bars that are placed upon the roof of an emergency vehicle so as to provide a warning signal to others of the approach of the emergency vehicle.

BACKGROUND ART

Typically, police cars, fire engines, ambulances, and other emergency vehicles employ a light bar. These light bars provide a visual warning signal of the approach of the emergency vehicle. The light bar is positioned on the roof of the vehicle so that oncoming traffic can see the emergency vehicle.

In most visual warning devices, it is the generally accepted practice to sweep one or more beams of light through a plane of rotation. A flashing or constantly varying signal, emanating from the source, is thus presented to an observer position some distance therefrom. In most cases, the beam is rotated within a flat plane to alert the observer while, in others, the beam may be oscillated above and below the plane of rotation to produce what is called a "wig-wag" signal.

Typically, two techniques are employed to generate a moving light signal and, thus, create a flashing effect. The most common approach is to simply mount a number of light sources upon a rotatable platform and rotate the entire structure about a common axis of rotation. Alternatively, warning devices employing a stationary light source have been devised in which moving reflectors are passed through a stationary light beam to create a flashing effect. In each of these cases, the light signal requires a relatively large and cumbersome housing.

In most light bars employed in emergency vehicles, the light bars are positioned on the roof of the vehicle and extend above the roof of the vehicle for a considerable distance. The positioning of the light bar can have detrimental effects with respect to the maximum speed of the vehicle and the fuel economy of the vehicle. These light-bars cause a great deal of wind resistance as the vehicle moves through traffic. In many circumstances, these light bars are made of a plastic material that is subjected to damage and deterioration. Often, it is very difficult to attach these light bars to the vehicle. These light bars also can be extremely expensive.

Under certain circumstances, it is desirable for the emergency vehicle to appear as inconspicuous as possible. Typically, police cars employed in "unmarked" duty or in undercover duty will not use a conspicuous light bar. Many times, these vehicles have the light bar installed in the interior of the vehicle or detachably positioned on the roof of the vehicle. When the light bar placed within the vehicle, it is often difficult for observers to see the flashing lights from all directions. Those flashing signals that are removably positioned on the roof of the vehicle will be cumbersome to install and often become dislodged during the fast movement of the vehicle.

In the past, various U.S. patents have been granted which describe various types of light bars. U.S. Pat. No. 3,633,161, issued on Jan. 4, 1972, to Charles Price describes a rotating beacon which is in the shape of a pyramid having upwardly and inwardly extending corners defining a plurality of sides. The corners provide a discernible reduction in light so as to give a pattern of intermittent flashing of light from the side panels of the pyramid upon rotation. The bottom of the pyramid is enclosed with a reflective member and a gear wheel which allows the pyramid to be rotated by an electrical motor.

U.S. Pat. No. 4,104,615, issued on Aug. 1, 1978, to E. T. Hunter teaches a flashing light signal that includes a rotatably mounted signal generator formed of a light transmitting material and a non-rotatable source of light adapted to direct light into the generator upon its axis of rotation. A pyramid-shaped prism is associated with the generator having its apex positioned along the axis of rotation. The prism surfaces intercept the light directed into the generator, split the light into one or more beams, and direct the beams toward the exit face that is substantially perpendicular to the axis of rotation.

U.S. Pat. No. 5,000,535 describes a fiberoptic light bar employed in a display fixture. In this patent, a fiberoptic bundle is extended into the interior of the housing. A light source is connected to the end of the bundle so as to provide light to the interior of the housing. Each of the ends of the fiberoptics face outwardly of the housing.

U.S. Pat. No. 5,122,933 describes a perimeter message and clearance lighting for a cargo vehicle container body. A pair of elongated fiberoptic cables are individually encased in a correspondingly elongated enclosure so as to illuminate the interior of the enclosure and to pass light through an outward translucent face of the enclosure so as to present a graphic message. The fiberoptic cables are constructed to propagate light flux longitudinally and radially.

U.S. Pat. No. 5,165,774, issued on Nov. 24, 1992, to G. R. Windross describes a fiberoptic wide-angle illuminating device. This device includes a yoke having a C-shaped head for receiving and supporting output ends of the optical fibers in a splayed-out fashion in a row. A single wide-angle optical lens is aligned in a predetermined relationship with a single aperture for receiving light emitted from the optical fibers through the aperture and for projecting the light in a desired beam pattern.

U.S. Pat. No. 5,193,893, issued on Mar. 16, 1993, to M. A. Mitko provides a vehicle hood deflector for attachment to the hood of a vehicle so as to project above it. The interior of the enclosure is illuminated so as to make a visible sign on the front of the enclosure. A fiberoptic cable has input terminals illuminated by the vehicle headlights and output terminals extending into the enclosure so as to illuminate the signs by the headlights.

U.S. Pat. No. 5,276,594, issued on Jan. 4, 1994, to Burkett et al. provides an add-on vehicle safety light monitor. A light pipe is provided which has an input end and an output end. The light pipe is configured to be supported upon the vehicle body at a position in which the input end is approximate to the to-be-monitored light source and the output end is viewable by the vehicle driver or operator.

It is an object of the present invention to provide a light bar that has a relatively short profile.

It is another object of the present invention to provide a light bar that improves the aerodynamics of the vehicle to which it is attached.

It is another object of the present invention to provide a light bar that reduces the number of moving parts and electronics.

It is a further object of the present invention to provide a light bar that is attractive, produces the necessary luminance, and is easy to install.

It is still a further object of the present invention to provide a light bar that is relatively inexpensive and easy to manufacture.

These and other objects and advantages of the present invention will become apparent from a reading of the attached specification and appended claims.

SUMMARY OF THE INVENTION

The present invention is a light bar for a vehicle that comprises a body, a light source, a plurality of optical fibers extending within the body, and a means for directing light from the light source to the plurality of optical fibers. The optical fibers have one end generally facing the light source and another end facing outwardly of the body.

The body comprises a base plate having a means for securing the base plate to the roof of the vehicle, and a cover affixed to the base plate and extending over the plurality of optical fibers and the means for directing. A laminate layer overlies the plurality of optical fibers and is bonded to the base plate. The cover is affixed to the laminate layer. The body has a generally triangular configuration. The cover is positioned generally centrally relative to the base plate.

The light source is stationary and generally non-rotatable relative to the body. The plurality of optical fibers are positioned around the light source such that each of the plurality of optical fibers has an end facing the light source. The plurality of optical fibers are positioned at generally equal intervals in a single plane so as to radiate outwardly relative to the light source.

The means for directing includes a housing which is positioned around the light source. The housing is rotatable relative to the light source. The housing has at least one aperture formed therein. The light source directs light through the aperture to at least one of the plurality of optical fibers. The housing has a reflective surface opposite the aperture. The reflective surface serves to focus the light toward the aperture. The reflective surface is of a generally semicircular cross-section. The reflective surface is positioned on an opposite side of the light source from the aperture. The aperture has an area generally matching a cross-sectional area of one of the plurality of optical fibers. The plurality of optical fibers is arranged in a single plane. The housing has a pair of apertures aligned with the plane of the plurality of optical fibers. A motor is connected to the housing and positioned within the body so as to rotate the housing around the light source. A power supply is electrically connected to the light source and to the motor. The power supply is positioned exterior of the body. The power supply has an electrical line extending into the body.

An alternative embodiment of the means for directing includes a reflective surface positioned within the body adjacent to the light source. The reflective surface is positioned on a side of the light source opposite the plurality of optical fibers. The plurality of optical fibers have ends arranged in a generally parabolic configuration relative to the light source. A shutter means is interposed between the light source and the ends of the optical fibers. The shutter means serves to selectively allow light from the light source to enter the optical fibers. The shutter means includes a shutter member extending in proximity to an end of at least one of the optical fibers, a solenoid connected to the shutter member for moving the shutter member over the end of the optical fiber, and a controller connected to the solenoid for actuating the solenoid. The controller is positioned exterior of the body.

BRIEF DESCRIPTION OF THE DRAWINGS

FIG. 2 is a front elevational view of the light bar in accordance with the present invention.

FIG. 3 is a plan diagrammatic view of the light bar in accordance with the present invention.

DETAILED DESCRIPTION OF THE INVENTION

Figure 1:
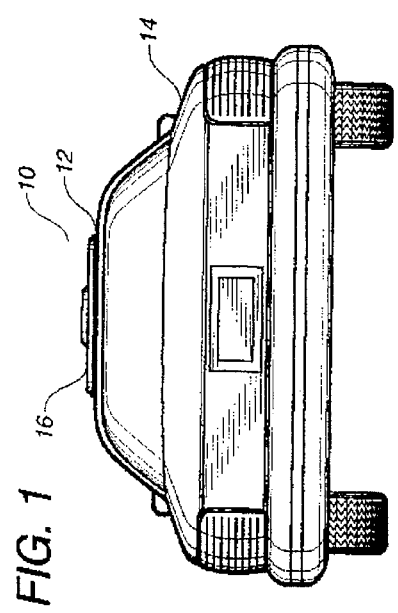
FIG. 1 shows an emergency vehicle having the light bar of the present invention thereon.

Referring to FIG. 1, there is shown at 10 the light bar of the present invention. The light bar 10 is illustrated as being affixed to the roof 12 of a vehicle 14. Typically, vehicle 12 can be a police car, an ambulance, a fire fighting vehicle, or another type of emergency vehicle. It can be seen in FIG. 1 that the light bar 10 has a relatively low profile (as compared to conventional light bars).

The light bar 10 has a base plate 16 that includes means for affixing to the roof 12 of the vehicle 14. The means 16 can include various techniques such as bolting, adhesive bonding, clamps, magnets, or VELCRO™. It is only necessary that the means 16 for securing the light bar 10 to the roof 12 be sufficiently strong so as to withstand any forces imparted upon the light bar 10 by the fast travel of the vehicle 14.

Generally, with reference to FIG. 1, it can be seen that the light bar 10 has a relatively inconspicuous appearance. As a result of this inconspicuous appearance, the light bar 10 can be employed in various types of unmarked or undercover operations. At first glance, persons are unable to see the light bar 10 when the lights are not illuminated. As such, the vehicle 14 will appear similar to conventional vehicle. The power supply and switches for the light bar 10 are located within the interior of the vehicle 14.

Referring to FIG. 2, the light bar 10 is shown in greater detail. The light bar 10 includes a base plate 16, a laminate layer 18, and a cover 20. It can be seen that a plurality of optical fibers 22 have an end which faces outwardly of the body 24 of the light bar 10. In normal use, the optical fibers 22 are used instead of conventional reflectors and rotating lights of conventional light bars. The ends of the optical fibers 22 face outwardly from the rearward edge of the body 24 and will also face outwardly of the front edge of the body 24.

The base plate 16 can have a wide variety of configurations. Typically, since the roof 12 of the vehicle 14 is slightly curved, the base plate 16 should be sufficiently flexible so as to allow the base plate 16 to conform to the curvature of the roof 12. The base plate 16 can be a section of metal material, of magnetic material, or of a plastic material. During the manufacture of the light bar 10, the optical fibers 22 are held in place by clips positioned on the base plate 16. Once the optical fibers 22 are properly positioned, the laminate layer 18 can be placed over the optical fibers. This will properly secure the optical fibers 22 in their proper position. The cover 20 can then be snap-fitted, affixed, or otherwise secured to the laminate layer 18. The cover 20 encloses the mechanical mechanisms of the present invention.

FIG. 3 illustrates the light bar 10 with its mechanical mechanisms exposed. It can be seen that the body 24 has a generally triangular configuration. This triangular configuration provides a greater amount of side visibility. The forward edge 28 has optical fibers 30 facing outwardly therefrom. Additional, or fewer, optical fibers can be positioned so as to face outwardly of the forward edge 28 of the light bar 10. The rearward edge 32 of the light bar 10 includes optical fibers 34 facing outwardly therefrom. It can be seen that the generally triangular configuration of the light bar 10 has an attractive, aerodynamic form.

In FIG. 3, the light bar 10 includes a first light control mechanism 36 and a second light control mechanism 38. It can be seen that the first light control mechanism 36 has a generally circular configuration. The optical fibers 22 have a first end positioned in the circular area 40 of the first light controlling mechanism 36. A light source 42 is positioned centrally thereof. The light control mechanism 36 has a configuration similar to that shown in FIGS. 4 and 5 (to be described hereinafter). In essence, the first light control mechanism 36 creates the "flashing" or strobe effect of the light bar 10.

The second light controlling mechanism 38 is designed to produce on/off lighting required of conventional light bars. Specifically, the second light control mechanism 38 includes the proper mechanism for simulating the takedown lights, the alley lights, and the back flashers of conventional light bars. It can be seen that the second light control mechanism 38 includes a light source 50 having a reflective surface 52 positioned adjacent thereto. The reflective surface 52 has a generally parabolic configuration. The reflective surface 52 can be mirrored so as to increase the luminance of the light source 50. The reflective surface 52 is positioned within the body 24 on a side of the light source 50 opposite the plurality of optical fibers 54.

The plurality of optical fibers 54 are arranged so that the input ends of the optical fibers are facing the light source 50. A shutter means 56 is associated with the optical fibers 58 and 60. The shutter means 56 is interposed between the light source 50 and the ends of the optical fibers 58 and 60. The shutter means 56 selectively allows light from the light source 50 to enter the optical fibers 58 and 60. Specifically, the shutter means 56 includes a shutter member 62 that is positioned in proximity to an end of the optical fibers 58 and 60. A solenoid is connected to the shutter member 62 so as to move the shutter means 56 over the ends of the optical fibers 58 and 60. The solenoid of the shutter means 56 is connected to a control mechanism 63 for actuating the solenoid. As can be seen in FIG. 3, the optical fibers 58 and 60 extend to the forward edge 28 of the light bar 10 and act as takedown lights. For example, when it is desired to constantly illuminate the takedown lights 58 and 60, then the solenoid is actuated such that the shutter member 62 moves away from the ends of the optical fibers 58 and 60. This allows the light from the light source 50 to pass light continously into the optical fibers.

Another solenoid 66 is associated with the optical fiber 68. The actuation of the solenoid 66 remove its associated shutter so as to allow light to pass continually through the optical fiber 68. The output of the optical fiber 68 will transmit light to the side edge 70 of the light bar 10 such that the optical fiber 68 serves as an alley light. Similarly, solenoid 72 and optical fiber 74 can be actuated such that light can be broadcast to the opposite side 76 of the light bar 10. This will act as the opposite side alley light.

The solenoid 78 is connected to the shutter 80. The shutter 80 opens and closes over the optical fibers 82 and 84. Optical fibers 82 and 84 can be actuated as back flashers of the light bar 10.

The importance of the second light control mechanism 38 is the direct control of the light produced by the light bar 10. With the proper operation of the control mechanism, the light bar 10 can easily simulate a conventionally employed light bar. By controlling the passage of light from the light source 50 through the numerous optical fibers, the light bar 10, of the present invention, can stimulate takedown lights, alley lights, and back flashers. The solenoids employed in the second light control mechanism 38 can be opened for a desired period of time so as to simulate a continually illuminated bulb. Alternatively, the solenoids, and the associated shutters, can be opened and closed intermittently so that a "flashing" effect can be achieved. A proper control panel, of a type conventionally used, can be connected to the controller 63 within the interior of the vehicle 14. An electrical, or fiberoptic, line can extend from the interior of the vehicle so as to be connected to the controller 63.

Figure 4:
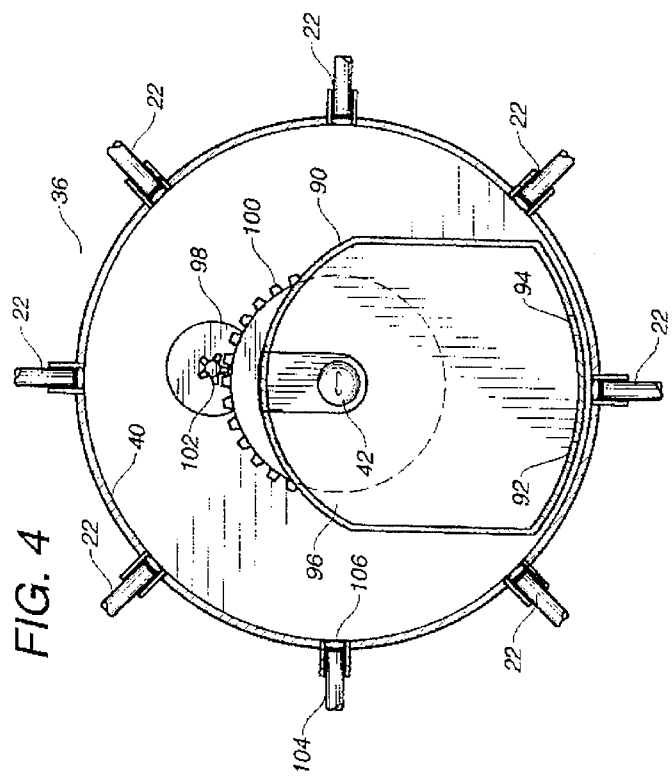
FIG. 4 is a cross-sectional top view of the means for directing light as used in the present invention.

FIG. 4 shows the operation of the first light control mechanism 36. It can be seen that each of the plurality of optical fibers 22 has an end which faces the light source 42. The light source 42 is positioned in a stationary and non-rotatable position. The optical fibers 22 are arranged in generally coplanar relationship. The optical fibers 22 radiate outwardly from the light source 42 at generally equal intervals.

In order to achieve the flashing effect, a housing 90 is positioned around the light source 42. The housing 90 is rotatable relative to the light source 42. The housing 90 has a first aperture 92 and a second aperture 94 formed therein. The light source 42 serves to direct light through the apertures 90 and 94 of the housing 90 to at least one of the plurality of optical fibers 22. The housing 90 has a reflective surface 96 opposite the apertures 92 and 94. This reflective surface 96 serves to focus the light from the light source 42 toward the apertures 92 and 94. The reflective surface 96 is of a generally semi-circular configuration. The reflective surface 96 is positioned on an opposite side of the light source 42 from the apertures 92 and 94. Each of the apertures 92 and 94 have an area generally matching the cross-sectional area of each of the plurality of optical fibers 22. As the housing 90 rotates, the apertures 92 and 94 are brought into proximity with the ends of the optical fibers 22. The apertures can have lenses incorporated therein so as to either focus the light toward the optical fiber or to filter the light so as to provide a colored light output from the optical fibers. When this occurs, light will pass through the apertures 92 and 94 and into the optical fibers 22 which correspond to the opening the apertures 92 and 94. A motor 98 is connected to the housing 90. The motor 98 is positioned within the body 24 of the light bar 10. The motor 98 serves to rotate the housing 90 around the light source 42. A geared member 100 is engaged with the gear 102 of the motor 98 so as to provide for this rotational capability.

Importantly, in FIG. 4, it can be seen that the optical fibers 22 have their ends generally aligned with the circular interior 40. However, one of the optical fibers 104 has a lens 106 positioned at this circular interior 40. The lens serves to focus the light from the light source 42 onto the optical fiber 104. If it is necessary to enhance the amount of light passing into the optical fiber 104, then lens 106 can be employed with the other optical fibers 22. The lens 106 can also be incorporated into the system as a light filter so as to provide color to the light emitted from the light bar.

Figure 5:
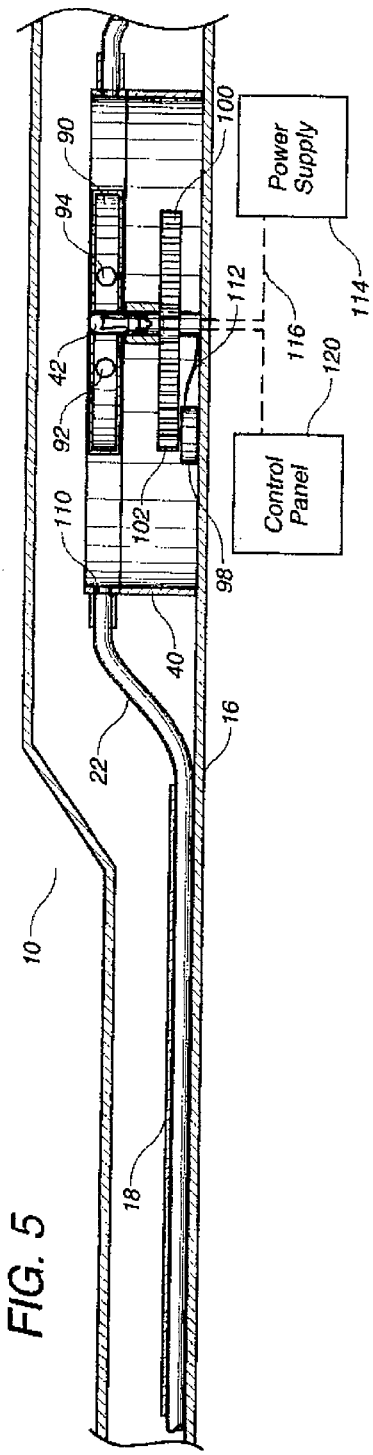
FIG. 5 is a cross-sectional view showing the operation of the light bar of the present invention.

In FIG. 5, it can be seen that the optical fibers 22 extend through the interior of the light bar 10. The optical fiber 22 resides on the top surface of the base plate 16. A laminate layer 18 extends over the optical fiber 22 so as to secure the optical fiber 22 in its proper position. The optical fiber 22 has an end 110 opening at the circular interior 40. The housing 90 is provided within this circular interior. Housing 90 includes apertures 92 and 94. Apertures 92 and 94 have a diameter generally matching the diameter of the optical fiber 22. The light source 42 is positioned centrally of the circular area 40. The motor 98 has the gear member 102 connected thereto. A line 112 extends to the power supply 114 so as to provide the proper power for the actuating of the motor 98. As the motor 98 rotates the gear 102, the gear 100 will rotate the housing 90. The gear 100 extends around the light source 42. The power supply 114 is electrically connected along line 116 to the light source 42. The power supply 114 can be the battery of the vehicle 14 or it can be an independent power supply. A control panel 120 is positioned within the interior of the vehicle 14 so as to allow the operator of the vehicle to turn the light source 42 on and off and also to allow the operator of the vehicle 14 to properly actuate the lights associated with the second light control mechanism 38.

Through the novel use of fiberoptics, the light bar 10 of the present invention achieves advantages not found on conventional light bars. Most importantly, the light bar 10 has a generally flat, low profile configuration. This low profile configuration improves the aerodynamic capability of the light bar 10, reduces fuel consumption, and serves to increase the maximum speed of the vehicle 14. The light bar 10 is of an inconspicuous appearance. The optical fibers 22 will generate a great deal of light. In tests conducted with the present invention, the optical fibers 22 are capable of producing light output generally matching those flashing lights of conventional light bars. The present invention employs only a single motor and electrical system. As such, the complicated mechanisms associated with conventional light bars are eliminated.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. A light bar for a vehicle comprising:

a body;

a light source;

a plurality of optical fibers extending within said body, said plurality of optical fibers having one end generally facing said light source and another end facing outwardly of said body, said body comprising:

a flexible base plate having means for securing to a roof of the vehicle;

a cover affixed to said base plate and extending over said plurality of optical fibers and said means for directing; and a laminate layer overlying said plurality of optical fibers and bonded to said base plate, said cover affixed to said laminate layer; and means for directing light selectively from said light source to said plurality of optical fibers, said means positioned within said body; and a housing positioned around said light source, said housing being rotatable relative to said light source, said housing having at least one aperture formed therein, said light source directing light through said aperture to at least one of said plurality of optical fibers.

2. The light bar of claim 1, said body having a generally triangular configuration, said cover positioned generally centrally relative to said base plate.

3. The light bar of claim 1, said light source being stationary and nonrotatable relative to said body.

4. The light bar of claim 3, said plurality of optical fibers positioned around said light source such that each has an end facing said light source.

5. The light bar of claim 4, said plurality of optical fibers positioned at generally equal intervals in a single plane radiating outwardly from said light source.

6. The light bar of claim 1, further comprising:

a power supply electrically connected to said light source and to said motor means, said power supply positioned exterior of said body, said power supply having an electrical line extending into said body.

7. The light bar of claim 1, said means for directing comprising:

a reflective surface positioned within said body adjacent said light source, said reflective surface positioned on a side of said light source opposite said plurality of optical fibers.

8. The light bar of claim 7, said plurality of optical fibers having ends arranged in a generally parabolic configuration relative to said light source.

9. The light bar of claim 8, said plurality of optical fibers further comprising:

a shutter means interposed between said light source and said ends of said plurality of optical fibers, said shutter means for selectively allowing light from said light source to enter said plurality of optical fibers.

10. The light bar of claim 9, said shutter means comprising:

a shutter member extending in proximity to said one end of at least one of said plurality of optical fibers;

a solenoid means connected to said shutter member, said solenoid means for moving said shutter member over said one of the optical fiber; and control means connected to said solenoid means, said control means for actuating said solenoid means, said control means positioned exterior of said body.

11. The light bar of claim 1, said body having a forward edge and a rearward edge, at least one of said plurality of optical fibers having said another end positioned on said forward edge, at least one of said plurality of optical fibers having said another end positioned at said rearward edge.

12. The light bar of claim 1, at least one of said plurality of optical fibers having a lens means positioned over an end of the optical fiber, said lens means for focusing light from said light source toward the optical fiber.

13. The light bar of claim 1, said plurality of optical fibers extending in co-planar relationship around said light source, said plurality of optical fibers radiating outwardly from said light source.

14. A light bar of for a vehicle comprising:

a body;

a light source;

a plurality of optical fibers extending within said body, said plurality of optical fibers having one end generally facing said light source and another end facing outwardly of said body; and means for directing light selectively from said light source to said plurality of optical fibers, said means positioned within said body, said means for directing comprising:

a housing positioned around said light source, said housing being rotatable relative to said light source, said housing having at least one aperture formed therein, said light source directing light through said aperture to at least one of said plurality of optical fibers, said housing having a reflective surface opposite said aperture, said reflective surface for focusing the light toward said aperture, said aperture having an area generally matching a cross-sectional area of one of said plurality of optical fibers, said plurality of optical fibers arranged in a single plane, said housing having a pair of closely spaced apertures aligned with said plane of said plurality of optical fibers; and a motor means connected to said housing, said motor means positioned within said body, said motor means for rotating said housing around said light source.

15. The light bar of claim 14, said reflective surface being of a semicircular cross-section, said reflective surface positioned on an opposite side of said light source from said aperture.

* * * * *